US008275879B1

(12) United States Patent
Fickie et al.

(10) Patent No.: US 8,275,879 B1
(45) Date of Patent: Sep. 25, 2012

(54) GENERALIZED VIRTUALIZER IO PATH MODEL AND GENERAL VIRTUAL TRANSFORMATION MODEL FOR STORAGE ASSETS

(75) Inventors: Kenneth Edward Fickie, Ashland, MA (US); Amanuel Ronen Artzi, Framingham, MA (US); Sesh Jalagam, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 723 days.

(21) Appl. No.: 12/059,410

(22) Filed: Mar. 31, 2008

(51) Int. Cl.
*G06F 15/173* (2006.01)
(52) U.S. Cl. ......... 709/224; 717/104; 709/223; 709/225
(58) Field of Classification Search ........... 709/223–226
See application file for complete search history.

(56) References Cited

U.S. PATENT DOCUMENTS

2006/0271677 A1* 11/2006 Mercier ........................ 709/224
2009/0119396 A1* 5/2009 Kanda ........................... 709/223

OTHER PUBLICATIONS

Cisco Systems, "Cisco and EMC Invista Design Guide", 2006, pp. 1-18. http://ciscosystems.com/web/partners/pr67/emc/docs/invista_design_guide.pdf.*

* cited by examiner

*Primary Examiner* — Ian N. Moore
*Assistant Examiner* — Jackie Zuniga
(74) *Attorney, Agent, or Firm* — Krishnendu Grupta; Gerald P. Kazanjian

(57) ABSTRACT

Modeling a data path of a network environment is disclosed. Components are identified at a source location of a data path, at a target location of the data path, and connections there between. The network environment includes a plurality of domains, and the data path traverses the plurality of domains. Components and the connections there between are assigned to one of: an input-output path pattern, a virtualizer pattern, and a meta pattern. The patterns represent common elements of components of the network environment. The patterns and relationships between patterns are defined to repeat within and across domains in the network environment. A model of the data path is created from the assigned patterns and the defined relationships between patterns. The created model of the data path is then presented.

18 Claims, 12 Drawing Sheets

GENERALIZED VIRTUALIZER IO PATH MODEL AND GENERAL VIRTUAL TRANSFORMATION MODEL FOR STORAGE ASSETS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs). A storage area network is a collection of data storage systems that are networked with a number of host computer systems that operate as servers to access data stored in the data storage systems.

Enterprise Storage Networks are large, complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

It is possible to model any kind of network, including a storage area network, by representing the connections between the components of the network, and the components of the network, as abstractions. Such abstractions are then interconnected themselves to form a network model.

SUMMARY

Conventional models of storage area networks are large, complex, and abstruse object models that describe storage, host, and application configurations, and their interconnections, within a storage area network. Obtaining an end-to-end configuration view of how data is stored from the host-side application through host LVM and virtualization layers through a storage area network having multiple virtualization layers to the disk spindle on a storage array is an arduous task. Current models show no similarity as one moves from one domain to another. The result is a model that is difficult to understand, implement, query, traverse, and analyze, and may contain extraneous information not needed to enable such management functions.

Embodiments disclosed below provide for a generalized model of a data path within a network environment, which may include a storage network environment, such as a storage area network. In the context of a storage network environment, some embodiments describe, for example, the data path from applications within a host that is part of a storage area network through all associated interconnects to its ultimate resting place on a physical storage device, such as a disk drive that is a part of a storage array within the storage area network. Whatever the network environment, the model uses a recursive set of patterns to provide a simplified model. That is, basic patterns may be repeated according to known relations between the patterns to represent the network environment. In a storage network environment, the three basic patterns in the model are the Input-Output (IO) path, the virtualizer, and meta patterns. Application of these basic patterns in succession describes the essential features needed to provide rapid querying necessary for generic storage provisioning.

The generalized model, which may apply to any network environment, is non-standard, but may be overlaid on a standardized model. For example, in a storage network environment, this overlay may be used to tease out the critical information for understanding the global picture of an enterprise storage infrastructure, enabling its alteration in an efficient manner.

Using the generalized model described herein reduces the complexity associated with known standardized models. Thus, in the context of a storage network environment, the generalized model enables a broad understanding of end-to-end storage in a simplified way. The generalized model enables provisioning by providing only essential features needed for provisioning, instead of extraneous data that may require processing even if not needed for provisioning. The generalized model also enables rapid cross-domain virtualization representation. That is, because components of a storage network environment may be modeled by use of the same three basic patterns, applied repeatedly and recursively across and within domains, a global view of the storage domain is quickly achieved. Further, the generalized model eliminates data inconsistency due to the recursive nature of the basic patterns used to construct the generalized model, thereby increasing the authoritativeness of any products making use of the generalized model.

Though descriptions and examples of embodiments provided herein may be stated in the context of a storage network environment, such as but not limited to a storage area network, embodiments are not so limited and may, as is also shown below, be applied to any network environment, or indeed, any environment that may be considered similar to a network. In other words, any environment that includes a collection of resources that are interconnected in various ways may be modeled according to embodiments described herein.

More particularly, in an embodiment there is provided a method of modeling a data path of a network environment. The method includes identifying components at a source location of a data path, at a target location of the data path, and connections there between, wherein the network environment comprises a plurality of domains, and the data path traverses the plurality of domains. The method also includes assigning components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment. The method also includes creating a model of the data path from the assigned patterns and the defined relationships between patterns; and presenting the created model of the data path.

In a related embodiment, the method may include identifying further components and connections there between the source location and the target location of the data path; assigning the further components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment; and augmenting the created model by including the assigned patterns of the further identified components and the connections there between according to the defined relationships between patterns.

In a further related embodiment, identifying further components and connections there between may include querying, from a connection point of the source location, a successive domain in the network environment to identify further components and connections there between; and repeating the step of querying for each successive domain in the network environment until the target location is queried. Augmenting may then include augmenting the created model by including the assigned patterns of the further identified components and the connections there between according to the defined relationships between patterns across successive domains between the source location and the target location of the data path. In another further related embodiment, identifying further components and connections there between may include identifying a new component in the network environment along the data path and any resulting connections required for the new component.

In another related embodiment, the method may include creating a query that, upon execution, defines elements of the data path from the source location to the target location by using the repetitive and recursive structure of the patterns and the relationships between the patterns. In a further related embodiment, the method may include receiving notification that a new component has been added to the data path; and using the created query to determine how the new component fits within the data path.

In yet still another related embodiment, the network environment may be a storage area network, and the method may include creating a model of the storage area network by: repeating the steps of identifying, assigning, and creating for each data path present in the storage area network; and combining each created model of each data path present in the storage area network according to connections between the data paths.

In another embodiment, there is provided a method of modeling a resource allocation path, wherein the resource allocation path comprises a collection of resources, wherein the collection of resources is part of a plurality of resources, and wherein the plurality of resources is located in an environment. The method includes identifying resources in the collection of resources that comprise the resource allocation path, wherein the environment comprises a plurality of domains, and the resource allocation path traverses the plurality of domains. The method also includes assigning a number of the identified resources to a virtualizer pattern, wherein a virtualizer pattern is a mapping between one or more resources and a virtual entity that includes the one or more resources, wherein the virtualizer pattern is defined to repeat across domains of the environment, and wherein a virtual entity may itself be a resource assigned to a virtualizer pattern for mapping to another virtual entity. The method also includes creating a model of the resource allocation path by repeating the step of assigning for all identified resources across the plurality of domains, and presenting the created model of the resource allocation path.

In another embodiment, there is provided a computer system including a memory, a processor, a display, and an interconnection mechanism coupling the memory, the processor and the display allowing communication there between. The memory of the computer system is encoded with a data path analysis and modeling application, that when executed in the processor, provides a data path analysis and modeling process that models a data path of a network environment, by causing the computer system to perform operations of: identifying components at a source location of a data path, at a target location of the data path, and connections there between, wherein the network environment comprises a plurality of domains, and the data path traverses the plurality of domains; assigning components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment; creating a model of the data path from the assigned patterns and the defined relationships between patterns; and presenting the created model of the data path.

In yet another embodiment, there is provided a computer program product, stored on computer readable medium, to model a data path of a network environment. The computer program product includes computer program code for identifying components at a source location of a data path, at a target location of the data path, and connections there between, wherein the network environment comprises a plurality of domains, and the data path traverses the plurality of domains; computer program code for assigning components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment. The computer program product also includes computer program code for creating a model of the data path from the assigned patterns and the defined relationships between patterns; and computer program code for presenting the created model of the data path.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by EMC, Inc., of Hopkinton, Mass.

Note that each of the different features, techniques, configurations, etc. discussed in this disclosure may be executed independently or in combination. Accordingly, the present invention may be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments of a generalized data path model, as disclosed and described herein, present, in a generic way, the relationship, in a network environment including a plurality of domains, between what one domain represents as data, through other domains. In the context of a storage network environment, a domain may be, but is not limited to, an array, a smart switch, a host, a virtual host, a file server, a logical volume manager, a multi-pathing application, or even a database application. The model is not an inherited extension of a standardized model, but rather is an abstraction to a form that is readily traversable for obtaining answers about relationships and understanding the end-to-end data path within the network environment. In the context of a storage network environment, such information is critical in order to plan, allocate, de-allocate, reserve, and provision storage resources. Embodiments of the generalized data path model are efficient in that they provide only that information that is necessary to achieve such processes.

Figure 1:
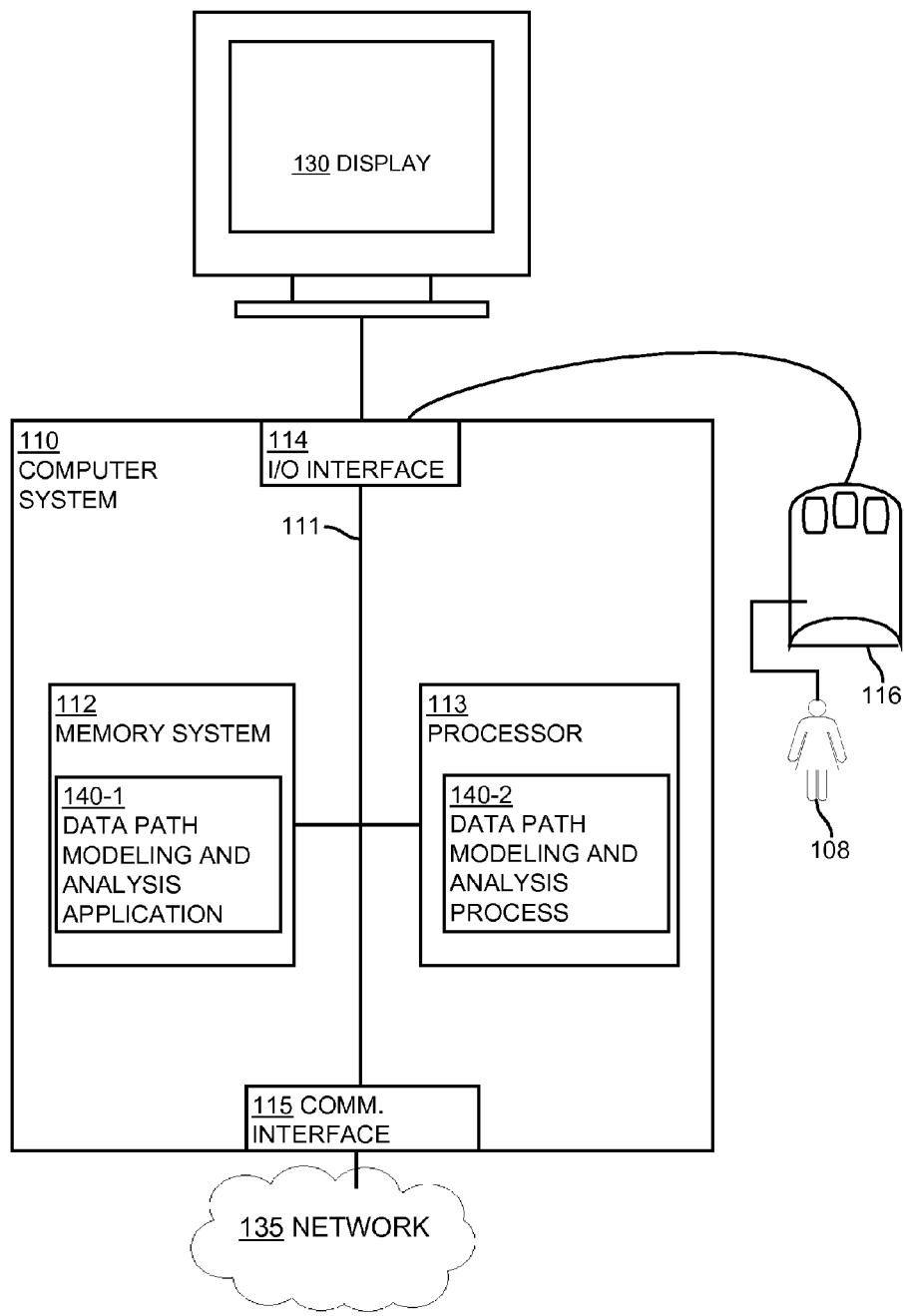
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a data path analysis and modeling application 140-1 and a data path analysis and modeling process 140-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a network 135 to provide input commands and generally administer the network 135 through, for example, a graphical user interface that may be provided on a display 130. The communications interface 115 enables the computer system 110 to communicate with other devices on the network 135. The network 135 may be any type of network environment, that is, any collection of resources that is interrelated. For example, a network environment may be a storage network environment, such as a storage area network.

The memory system 112 is any type of computer readable medium and in this example is encoded with a data path analysis and modeling application 140-1 that includes data path analysis and modeling process 140-2. The data path analysis and modeling application 140-1 may be embodied as software code such as data and/or logic instructions (e.g., code stored in the memory system 112 or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the data path analysis and modeling application 140-1. Execution of the data path analysis and modeling application 140-1 in this manner produces processing functionality in a data path analysis and modeling process 140-2. In other words, the data path analysis and modeling process 140-2 represents one or more portions or runtime instances of the data path analysis and modeling application 140-1 performing or executing within or upon the processor 113 in the computer system 110 at runtime.

It is noted that example configurations disclosed herein include the data path analysis and modeling application 140-1 itself including the data path analysis and modeling process 140-2 (i.e., in the form of un-executed or non-performing logic instructions and/or data). The data path analysis and modeling application 140-1 may be stored on a computer readable medium (such as a floppy disk), hard disk, electronic, magnetic, optical or other computer readable medium. The data path analysis and modeling application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the data path analysis and modeling application 140-1 in the processor 113 as the data path analysis and modeling process 140-2. Those skilled in the art will understand that the computer system 110 may include other processes and/or software and hardware components, such as an operating system not shown in this example.

Figure 2A:
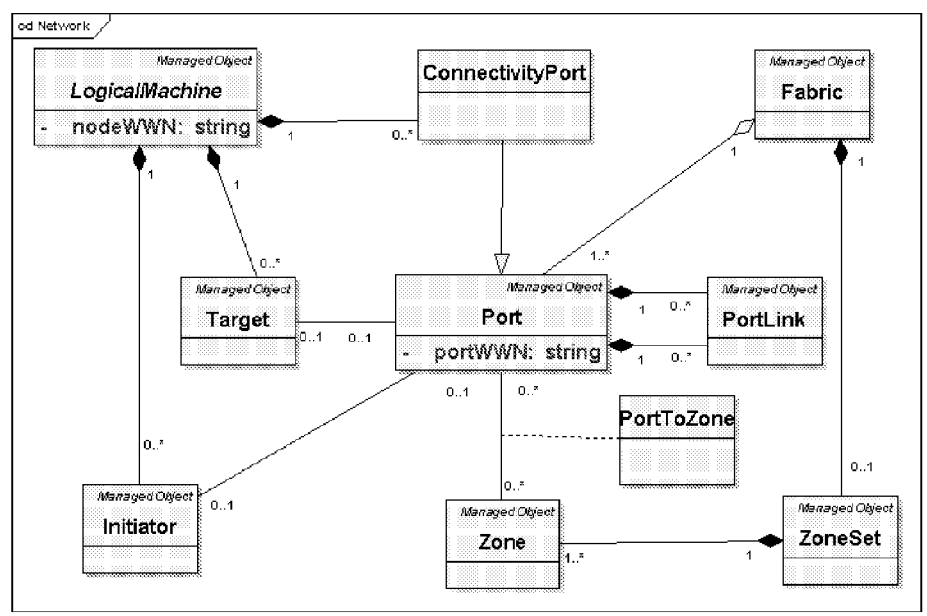
FIGS. 2A-2B are Unified Modeling Language (UML) representations of a network sub-model and a logical sub-model of the generalized model in a storage network environment context, created as described herein.
Figure 2B:
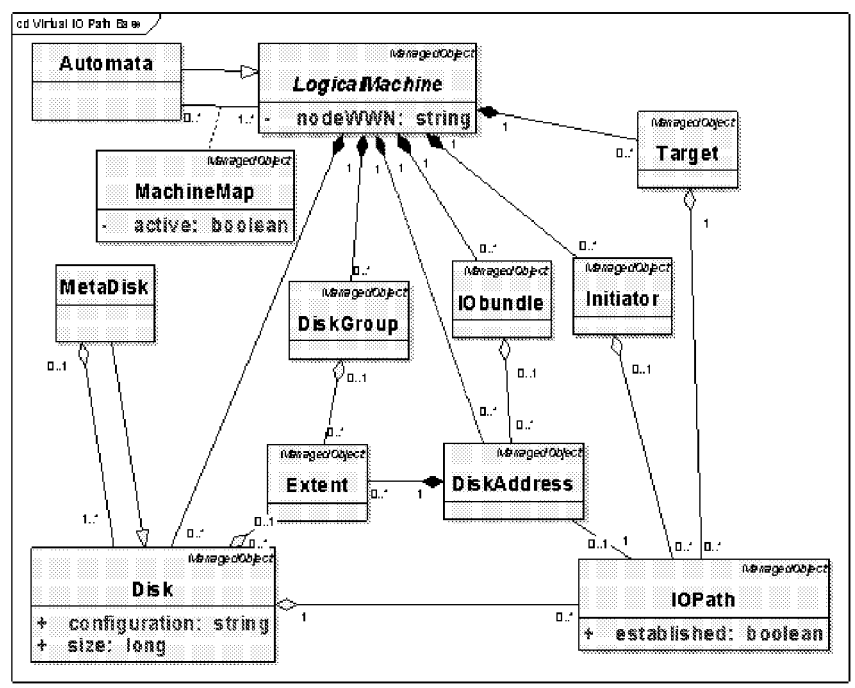
Figure 2C:
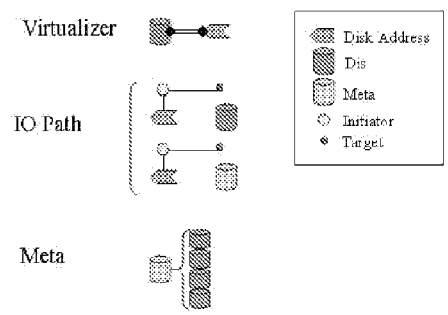
FIGS. 2C-2E are graphical examples of a model of a data path in a storage network environment, including it's the component parts of the data path and relationships between those components, created as described herein.

In the context of a storage network environment, the generalized data path model is comprised of two pieces: a network sub-model and a logical sub-model. These sub-models are shown in FIGS. 2A-2B. The network model describes the physical connectivity between domains through their ports. The focus of the network sub-model is switches (logical and physical), routers (logical and physical), and hubs (logical and physical), that form the interconnections between the hosts, arrays, and "smart" switches. Cycles in the data path relationships are not only allowed, but inevitable. The logical model provides a different view of the data path that incorporates both the logical elements and the physical elements that connect it to the network. The common intersections between the two sub-models are the ports that form the endpoints of the network. Examples of such ports are host-bus adapter ports of a host and front-end adapter ports of an array. Unlike the network model, cycles in the data path relationships are not allowed. The logical model is the recursive application of the same sequence of three basic patterns, which are shown in FIG. 2C. The basic patterns are the virtualizer pattern, the input-output (IO) path pattern, and the meta pattern. Each pattern draws from a domain comprised of six entity types (object classes): DiskAddress, Disk, Meta, Initiator, Target, and Extent; these classes are described in greater detail below. The virtualizer pattern expresses the many-to-many mapping from disk address to disk through the extent. The IO path pattern provides for the importation of a disk through the associated initiator in one domain from a disk exported from the target of another domain. The meta pattern says that a disk can be composed of zero, one, or more disks. The application of the meta pattern and the virtualizer pattern in sequence describes the data path in one domain. A subsequent application of the IO path pattern describes the data path from a disk in one domain to a disk in another domain.

A disk class is an exported entity to which the importing domain stores data. All disks have an exported size and a configuration indicating the type of data protection, e.g. RAID type. All disks are logical, except for those that are physical disks. All disks, except for physical disks, must be allocated from extents that are non-overlapping fractions of a disk address. Physical disks are stand-alone are terminating for any path. The size of any disk must be less than or equal to the cumulative size of its associated disks in the nearest domain that lies between this disk and the terminating physical disks. Virtualization is not free as it comes at a cost of consuming disk space as overhead.

A meta disk is a special disk that is composed of other disks. Meta disks may be concatenated or striped. A meta disk, rather than its composite disks, are exposed to other domains. The size of the meta disk is equal to or less than the cumulative size of the disks composing it.

A DiskAddress is the importing domain's representation of a disk exported by another domain. In some embodiments, it may be the SCSI address for that disk. Because it is an address, a one-to-one relationship exists between it and an IO Path pattern. The disk address is contained by a LogicalMachine, and has a many-to-one association to its input-output (IO) bundle. In some embodiments, this containment relationship may be removed in favor of a containment relationship through the IO bundle. In this latter case, even if multipathing is not present, those disk addresses would be associated with a trivial IO bundle of the same name as the disk address.

An extent is a fraction of the storage space represented by a disk address. Extents are atomic, and, therefore, do not overlap other extents. All extents must belong to some instance of a grouping entity, called a DiskGroup. Disks are carved out of these groups. Therefore, a Disk and its associated extents must belong to the same DiskGroup.

Figure 2D:
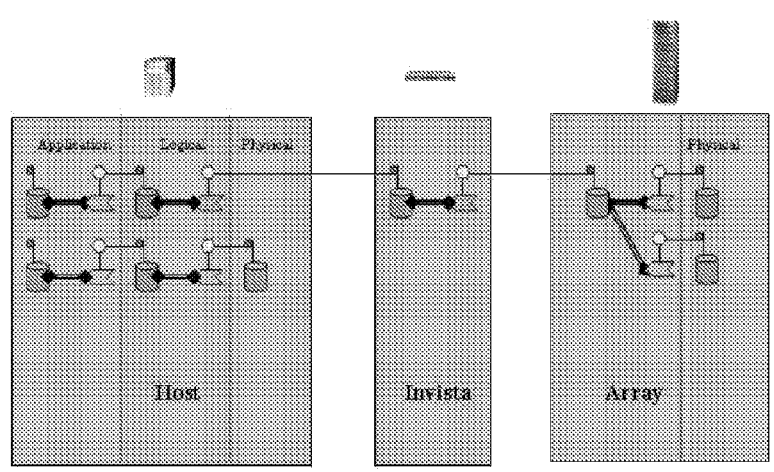

FIG. 2D shows an example of the repetitive nature of the basic patterns of the model as applied to a typical storage deployment. As shown in the example of FIG. 2D, there are three domains in the network environment: host, Invista, and array. The domains are connected to one another by way of an IO path pattern. Within the array, there are two domains, with an IO path pattern connecting the logic world of an array with its physical disks. For the host shown, there are three domains. One domain represents the physical world of local disks and ports. One domain represents the logical world of LVM and VMware. One domain represents the application world containing a VMware Virtual Machine and a database.

Figure 2E:
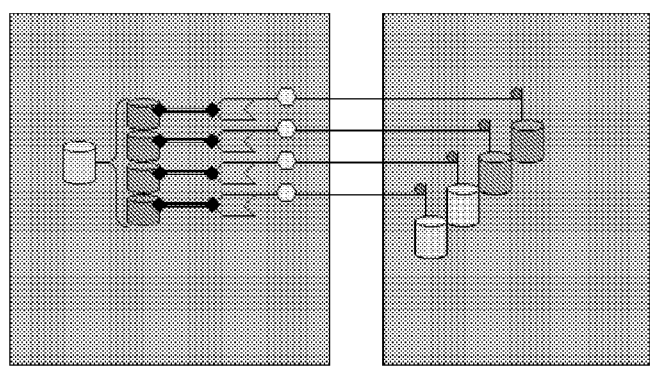
Figure 2F:
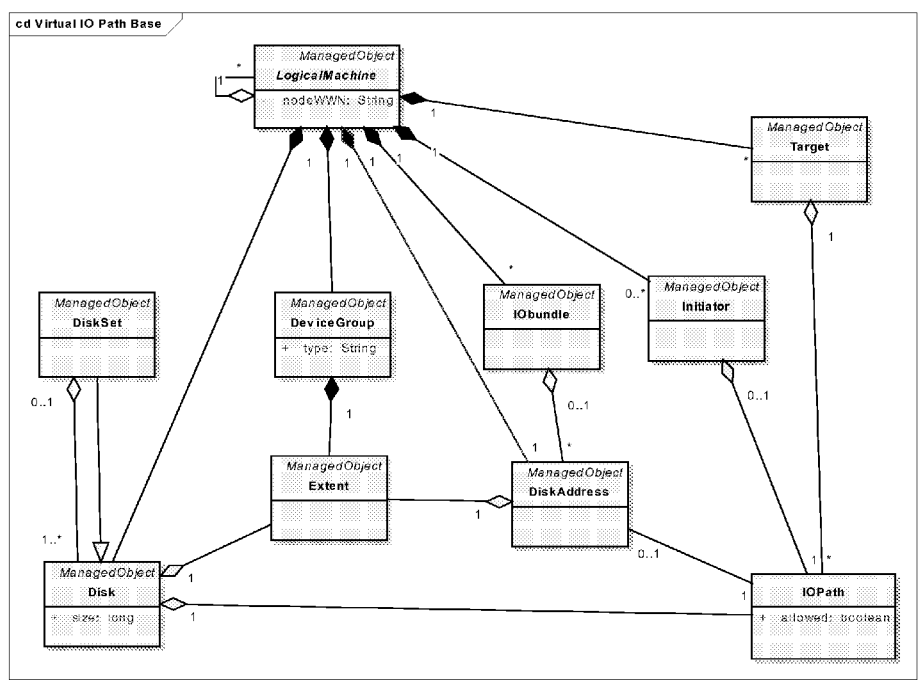
FIGS. 2F-2I are Unified Modeling Language (UML) representations of a model of a network environment created as described herein.
Figure 2G:
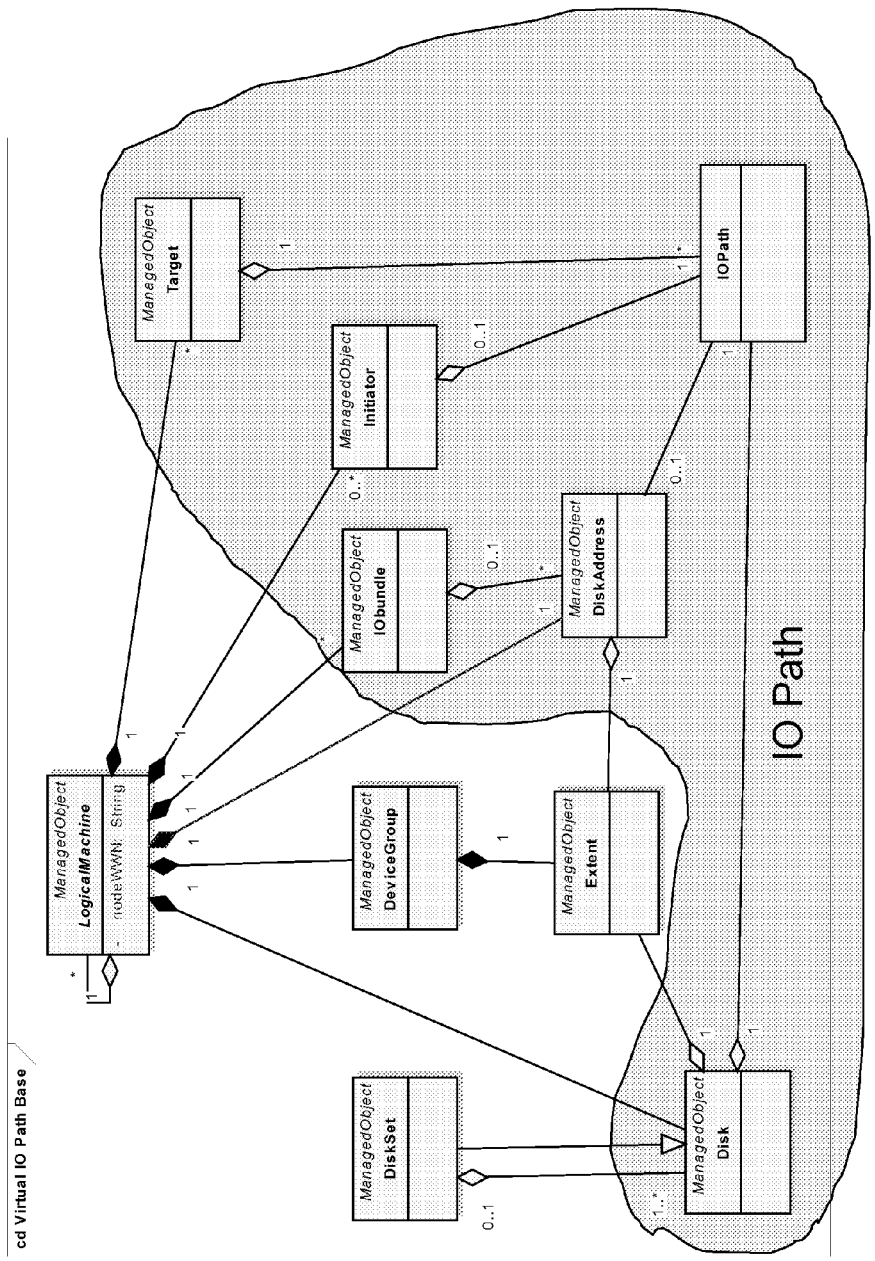
Figure 2H:
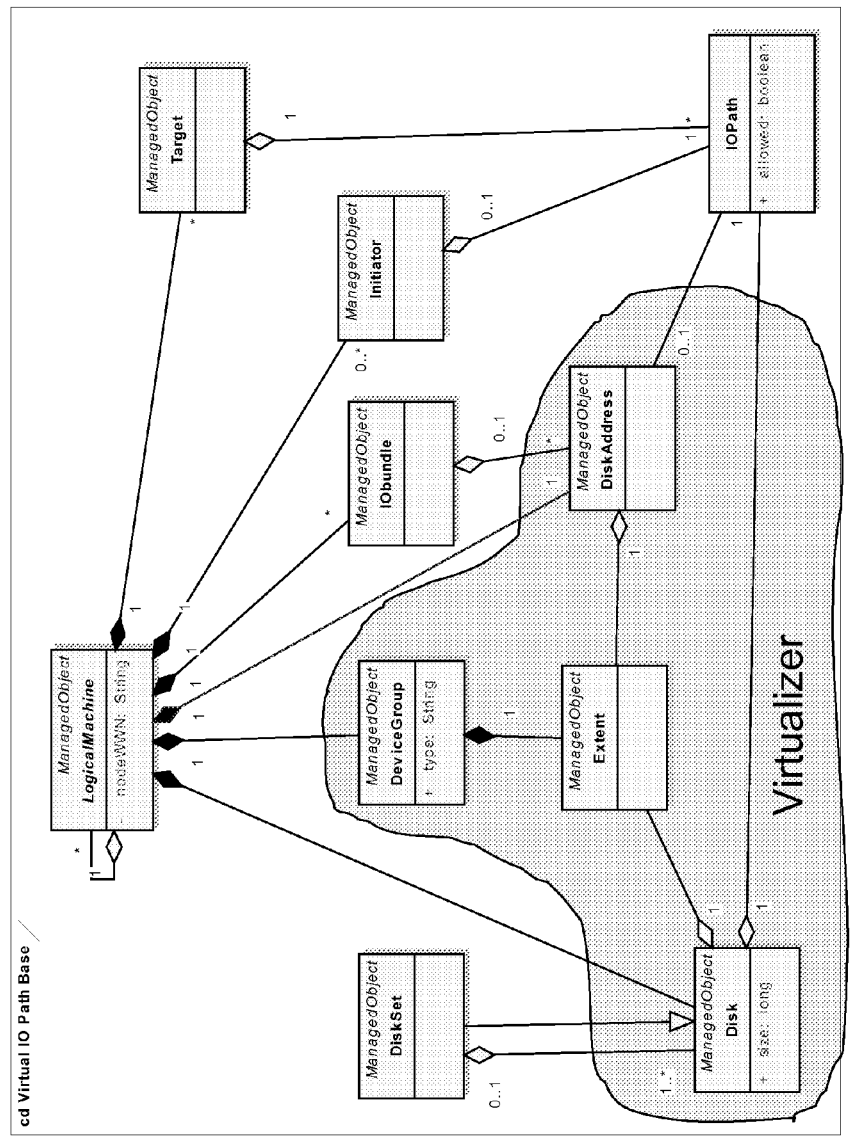
Figure 2I:
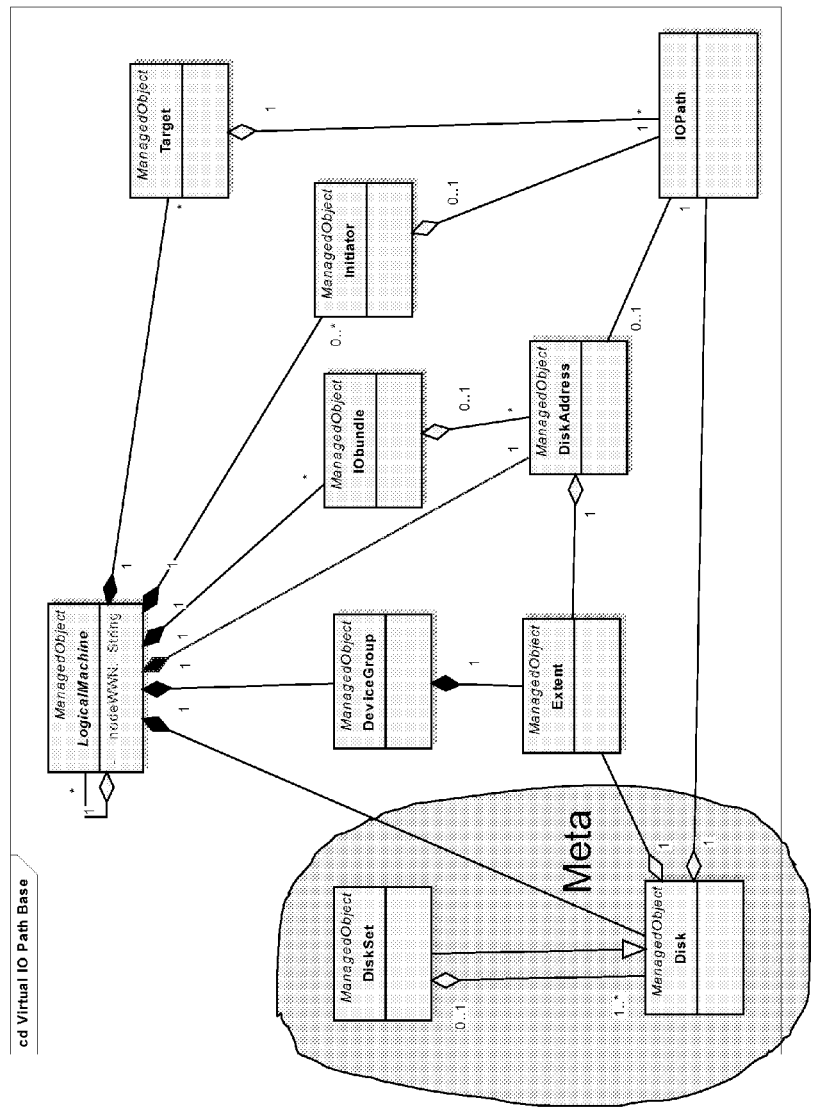

Table 1 below shows the classification of various objects in each of their domains to the various entity types represented in the patterns. FIG. 2E shows a different example of where a meta device in one domain is related to two simple disks and two meta devices in another domain by the consecutive application of the meta, virtualizer, and IO path patterns.

TABLE 1

Mapping of various type of storage objects to their entity type.

| Entity Type | Domain Examples |
| --- | --- |
| DiskAddress | Host Device, Invista Imported Storage Element, VMware Guest Device, Back-end Array Device, Database File |
| Disk | Physical Disk, Storage Volume, LVM Logical Volume, DB Tablespace, Invista Virtual Volume, VMFS, Mountable Host Partition |
| Meta | Sym Meta Device, Clariion Meta LUN |
| Initiator | File System Mount Port, VMware Virtual HBA, HBA, Host SCSI Controller, Invista Virtual Initiator, Array Back End Port |
| Target | File System, Host SCSI Target, Invista Virtual Target, Array Front-End Port, Array SCSI Target |
| Extent | Sym Hyper, LVM Extent, Veritas Plex/Subdisk |

A model of a data path, such as any of the examples shown in any of FIGS. 2A to 2I, may answer any of the following questions about the components of the network environment that comprise the data path. Note that these questions are particular to a storage network environment. Is the port zoned? Is the port physically connected? In what zones is the port a member? In what switch does a port belong? What switches compose a fabric? Is the storage volume mapped? Is the storage volume masked? Is the storage volume assigned? How much mapped storage is masked and unassigned? How much raw storage is available to be configured? Is a host logical volume really protected against disk failure?

Note that, in FIGS. 2A-2B and 2F-2I, some relationships between objects in the example models depicted in UML are shown as zero to one relationships (denoted as, for example, "0 . . . 1" in the figures). Relationships between such objects are not necessarily limited to just zero to one relationships, but may also include many to many relationships. Further note that a many to many relationship may be characterized as a many to one to many relationship.

Flow diagrams of particular embodiments are depicted in FIGS. 3-6. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 3:
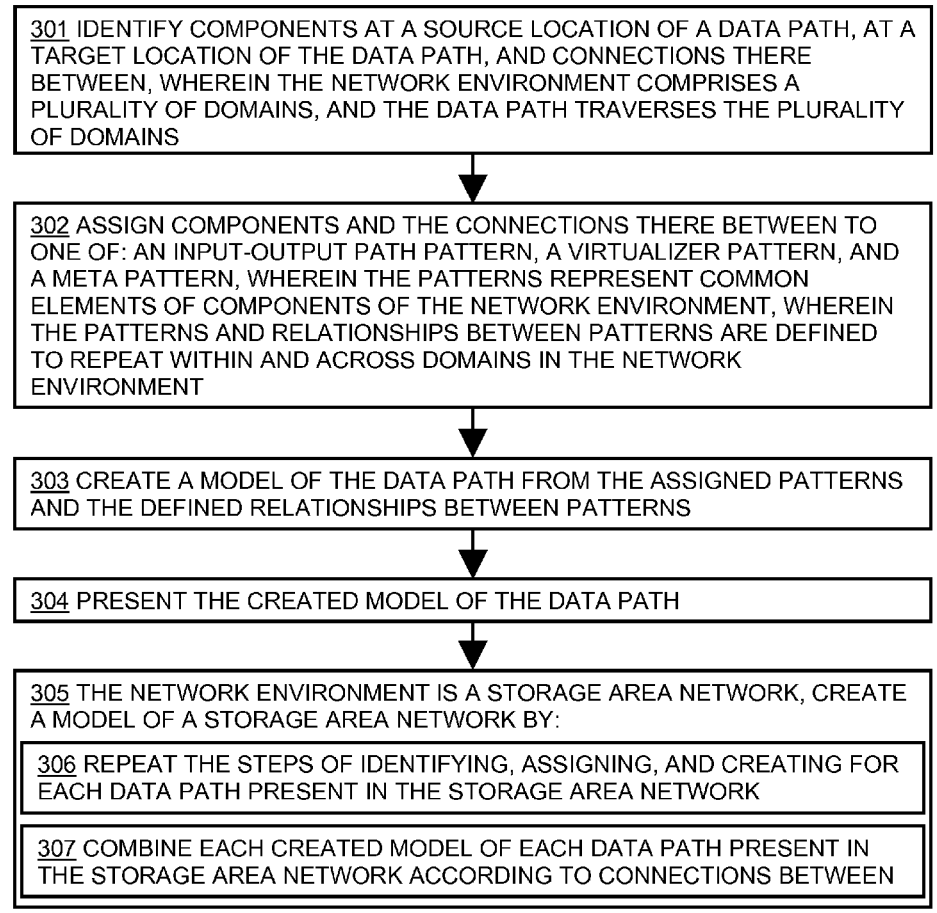
FIG. 3 illustrates a flowchart of a procedure performed by the system of FIG. 1 when modeling a data path within a network environment, and using this procedure to model a the storage area network.

In FIG. 3, the data path analysis and modeling process 140-2 described above with regards to FIG. 1 models a data path in a network environment using the three basic patterns described above with regards to FIGS. 2A-2I. The data path analysis and modeling process 140-2 first identifies components at a source location of a data path, at a target location of the data path, and connections there between, step 301. A source location is a beginning of a data path. In the context of a storage network environment, a source location is a location in the storage network environment along a data path that is farthest from an actual physical storage element. Thus, a target location is an actual physical storage element in a data path. In other words, in any network environment, the source location and the target location define endpoints of the data path. The network environment may comprise a plurality of domains. Thus, the data path may traverse the plurality of domains of the network environment. In some embodiments, a source location and a target location may be defined differently, such that the end points of the data path are not used as either one or both of the locations.

The data path analysis and modeling process 140-2 then assigns components and the connections there between to one of: an input-output path pattern, a virtualizer pattern, and a meta pattern, step 302. The data path analysis and modeling process 140-2 uses the input-output path pattern, the virtualizer pattern, and the meta pattern all as described and defined above with regards to FIGS. 2A-2I. In some embodiments, a virtualizer pattern maps (i.e., connects) data in a domain and where that data is stored, or more specifically, a disk and a disk address as defined above in the context of a storage network environment. In some embodiments, a meta pattern is a representation of an aggregation of data, such as a number of disks being linked to for a single entity. In some embodiments, an IO path pattern connects components of two different domains. In effect, an IO path pattern may aggregate the network connectivity between those two domains. Using the initiator and target instances of a data path, one may then use the network model to understand the network connecting the initiator and target. Note that, in some embodiments, particularly those involving a storage network environment, for the data path analysis and modeling process 140-2 to assign an IO path pattern, a disk and a target (as described above) must be defined. The patterns represent common elements of components of the network environment. For example, using the data path shown in FIG. 2D, where the network environment is a storage network environment, the disk element in the application domain of the host domain may be a database tablespace; the corresponding disk address elements may then be a database file; the corresponding target element of the logical domain of the host domain may be a file system; and the corresponding initiator element of application domain of the host domain may be a mount point. The data path analysis and modeling process 140-2 may similarly represent other components and their connections by application of the three basic patterns and the classes that comprise those patterns. Further, as shown in the example of FIG. 2D, the patterns and relationships between patterns are defined to repeat within and across domains in the network environment. That is, regardless of what a component/connection is, the data path analysis and modeling process 140-2 is able to assign it to one or more of the three basic patterns based on the definitions of those patterns, and their relationships.

The data path analysis and modeling process 140-2 then creates a model of the data path from the assigned patterns and the defined relationships between patterns, step 303. As stated above, and as described below in greater detail with regards to FIG. 4, the data path analysis and modeling process 140-2 initially needs only to know a component/components at the beginning of the data path and a component/components at the end of the data to create the model. For example, again referring to the example shown in FIG. 2D, where the network environment is a storage network environment, the data path analysis and modeling process 140-2 needs to know the components in the application domain of the host domain, and the components in the physical domain of the array domain, and that these are connected. Knowing these components, the data path analysis and modeling process 140-2 is able to assign them to the patterns, as described above, and then connects them appropriately to create the model of the data path. Because of the repetitive and recursive nature of the three basic patterns, the data path analysis and modeling process 140-2 is able to discern all other components between the beginning and the end of the data path by using known techniques, such as is described in greater detail herein.

Finally, the data path analysis and modeling process 140-2 presents the created model of the data path, step 304. In some embodiments, the data path analysis and modeling process 140-2 may present the created model by showing the model, or a portion thereof, graphically or otherwise on a display device, such as the display 130 shown in FIG. 1. That is, for example, in a storage network environment context, the data path analysis and modeling process 140-2 may use the graphical objects (i.e., icons) shown in FIG. 2C to create a graphical representation of the created model of the data path. The data path analysis and modeling process 140-2 may then show that graphical representation to a user or users. In other embodiments, the data path analysis and modeling process 140-2 may present the created model by providing it to another entity, such as but not limited to, an application, a hardware device, or a combination of the two. In other words, the data path analysis and modeling process 140-2 need not make the created model visible to a user to have presented the model. Providing the created model in some form, graphical, textual, or otherwise, is sufficient.

In some embodiments, the data path analysis and modeling process 140-2 may use the above identified steps to create a model of a storage area network, step 305. In such situations, the network environment is thus a storage area network. The data path analysis and modeling process 140-2 performs this task by repeating the steps of identifying, assigning, and creating for each data path present in the storage area network, step 306. That is, a storage area network may be considered to be a collection of various data paths. By creating models of each data path present in a storage area network, the data path analysis and modeling process 140-2 essentially creates models of all the elements of a storage area network. Thus, to complete the model of the storage area network, the data path analysis and modeling process 140-2 combines each created model of each data path present in the storage area network according to connections between the data paths, step 307. The result is a model of a storage area network that comprises the three basic patterns (virtualizer, IO path, and meta) described herein, repeated throughout the model. Such a model may then be presented (according to any of the ways described above) to, for example, an application that utilizes genetic programming principles to optimize the configuration of the storage area network. Such an application is described in co-pending application U.S. Ser. No. 12/058,854, filed herewith.

Figure 4:
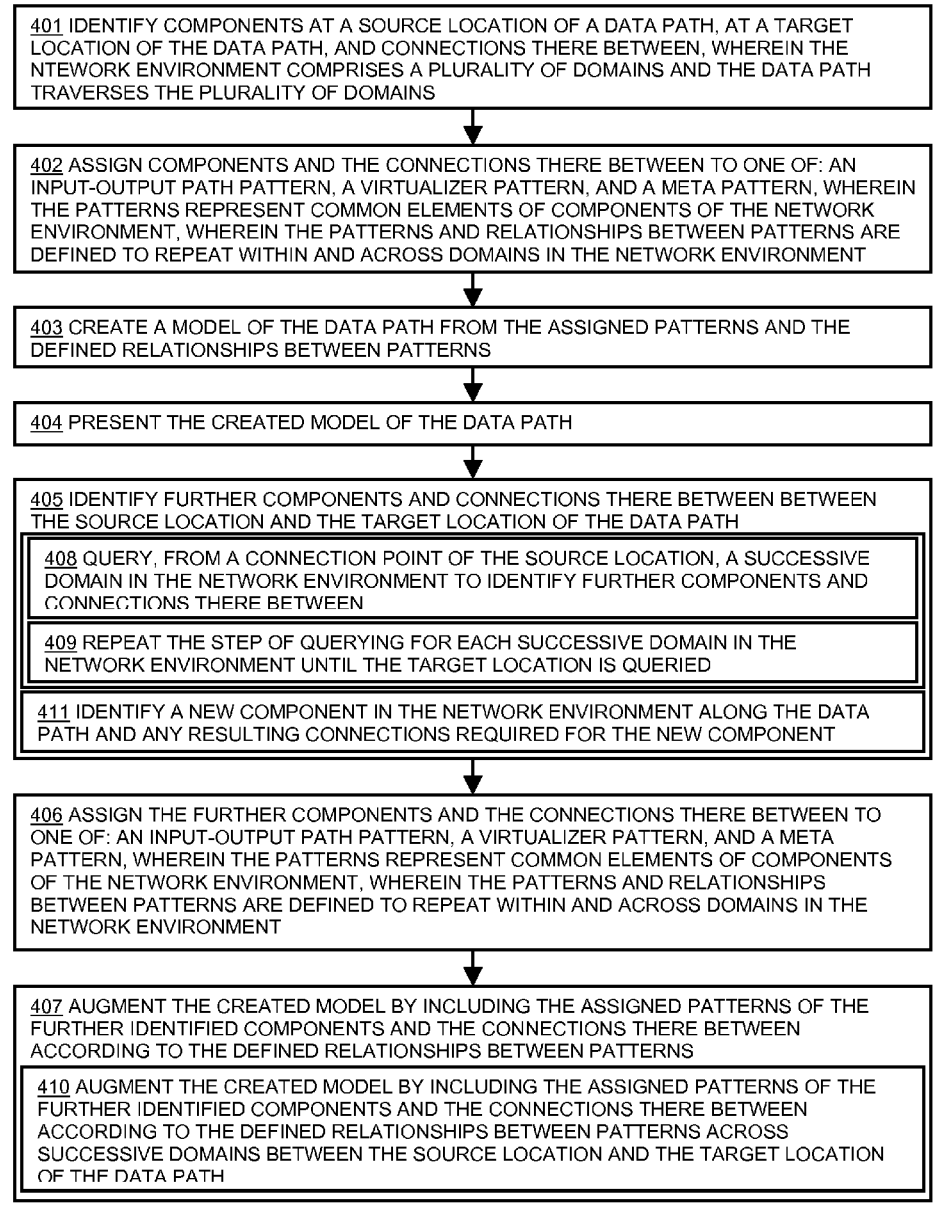
FIG. 4 illustrates a flowchart of a procedure performed by the system of FIG. 1 when augmenting a model of a data path.

FIG. 4 shows how the data path analysis and modeling process 140-2 may augment a modeled data path. The data path analysis and modeling process 140-2 first identifies components at a source location of a data path, at a target location of the data path, and connections there between, step 401, wherein the network environment includes a plurality of domains, and the data path traverses the plurality of domains of the network environment. The data path analysis and modeling process 140-2 then assigns components and the connections there between to one of: an input-output path pattern, a virtualizer pattern, and a meta pattern, step 402. The patterns represent common elements of components of the network environment, and the patterns and relationships between patterns are defined to repeat within and across domains in the network environment. The data path analysis and modeling process 140-2 then creates a model of the data path from the assigned patterns and the defined relationships between patterns, step 403, and presents the created model of the data path, step 404, all as described herein.

In some embodiments, the data path analysis and modeling process 140-2 does not know all of the components of the data path of the network environment between the source location and the target location of the data path. Thus, in some embodiments, the data path analysis and modeling process 140-2 may need to identify further components and connections there between between the source location and the target location of the data path, step 405. The data path analysis and modeling process 140-2 may so identify further components in any number of ways. For example, in some embodiments, the data path analysis and modeling process 140-2 may be configured to receive information about the components and connections between the source location and the target location from agent processes executing within the network environment. These agent processes, as are well known in the art, may provide a variety of information about components and connections within the network environment.

In other embodiments, the data path analysis and modeling process 140-2 identifies further components and connections there between by querying, from a connection point of the source location, a successive domain in the network environment, step 408. A connection point is a point in the modeled data path where two of the basic patterns are connected to each other. The data path analysis and modeling process 140-2 is able to query, or probe, from a connection point in the source location to a successive domain based on the known relationships between the patterns. In other words, in the context of a storage network environment, if the connection point is a location between a disk address that is connected by a virtualizer pattern to a disk, and an IO path pattern, the data path analysis and modeling process 140-2 knows that the other end of that IO path pattern must be connected to a disk in a successive domain. Because the data path analysis and modeling process 140-2 knows what class and/or pattern it is looking for, querying is a simple process. The data path analysis and modeling process 140-2 then repeats the step of querying, step 409, for each successive domain in the network environment until the target location is queried.

However the data path analysis and modeling process 140-2 identifies further components and the connections there between, the data path analysis and modeling process 140-2 then assigns the further components and the connections there between to one of: an input-output path pattern, a virtualizer pattern, and a meta pattern, step 406. The patterns represent common elements of components of the network environment, and the patterns and relationships between patterns are defined to repeat within and across domains in the network environment. In other words, the data path analysis and modeling process 140-2 assigns the same three basic patterns to the further identified components and the connections there between that the data path analysis and modeling process 140-2 assigned the initially known components and connections to. The relationships between those patterns remain the same as well. That is, even as further components and their connections are identified and modeled, the connections between the virtualizer pattern, the IO path pattern, and the meta pattern remain the same.

In some embodiments, the data path analysis and modeling process 140-2 may encounter one or more new components that have been added to a modeled data path. In such situations, the data path analysis and modeling process 140-2, instead of, or in addition to, identifying further components and connections there between, identifies a new component in the network environment along the data path, step 411. The data path analysis and modeling process 140-2 will then also identify any resulting connections required for the new component. Any new components and the connections there between are then assigned to one of: an input-output path pattern, a virtualizer pattern, and a meta pattern, step 406, and the model of the data path may be augmented with these patterns representing the identified new component(s). The repetitive and recursive nature of the patterns allows the data path analysis and modeling process 140-2 to quickly and easily address situations where a plurality of new components are being added, no matter how many new components there are, or how many new connections there between result. Further, the repetitive and recursive nature of the patterns also allows the data path analysis and modeling process 140-2 to quickly and easily deal with situations where one or more components is removed from the data path, or is moved to a different location in the data path.

Finally, the data path analysis and modeling process 140-2 augments the created model by including the assigned patterns of the further identified components and the connections there between according to the defined relationships between patterns, step 407. Using the example modeled data path of a storage network environment as shown in FIG. 2D, instead of simply having an IO path connection between the disk address of the application domain in the host domain, and the disk in the physical domain of the array domain, the augmented data path model may include (for example) the various patterns shown between those elements in FIG. 2C. In some embodiments, the data path analysis and modeling process 140-2 may augment the created model, step 410, by including the assigned patterns of the further identified components and the connections there between according to the defined relationships between patterns across successive domains between the source location and the target location of the data path. That is, because the data path analysis and modeling process 140-2 creates a model by using the three basic patterns repeatedly, and in the same way, the data path analysis and modeling process 140-2 may augment the model based on its knowledge of the relationships between the three patterns. This applies equally to situations where the further components are one or more new components that are added to the data path. However the data path analysis and modeling process 140-2 augments the created model, the data path analysis and modeling process 140-2 may present the augmented model using any of the techniques described herein.

Figure 5:
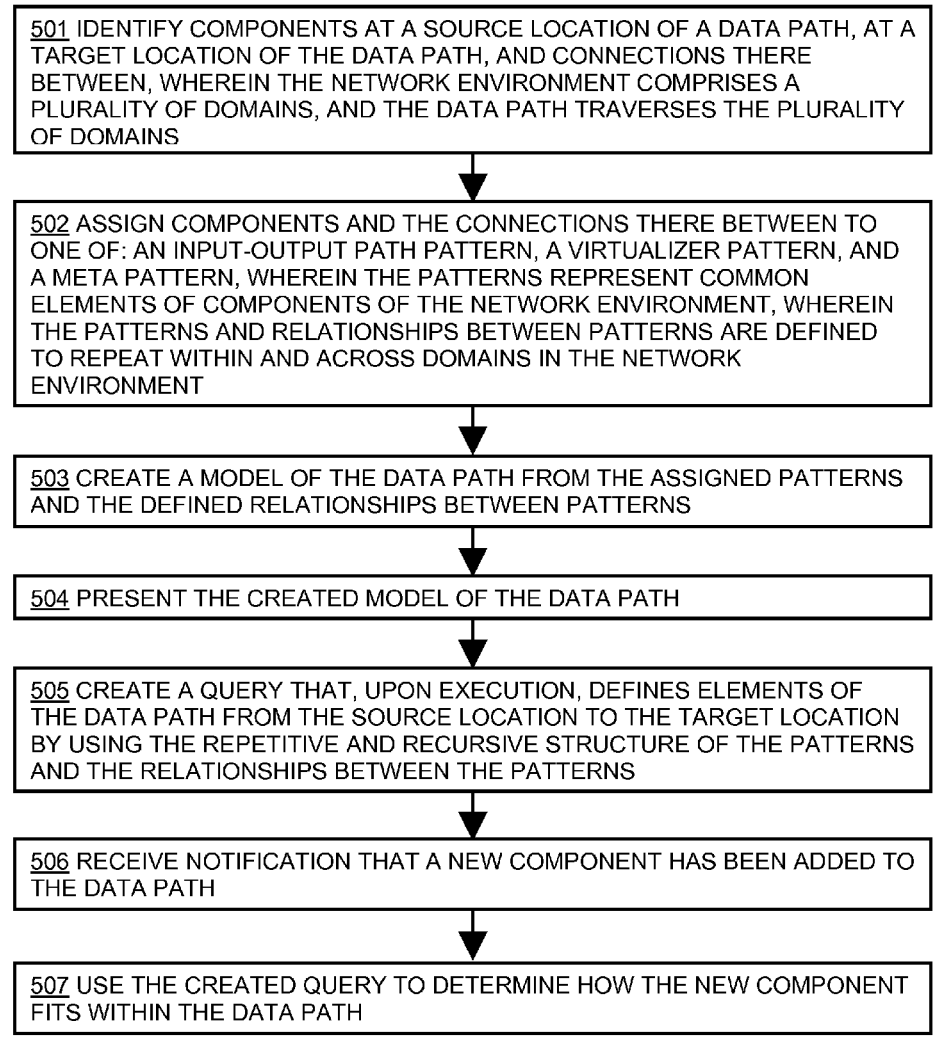
FIG. 5 illustrates a flowchart of a procedure performed by the system of FIG. 1 when using an existing query to discover new components added to the modeled data path.

In FIG. 5, the data path analysis and modeling process 140-2 creates a model of a data path, which is then used to formulate a query to determine all possible configurations of components within the data path. The data path analysis and modeling process 140-2 is able to apply that query, without any changes, even when new components have been added to the data path, or former components have been removed from the data path, or components have changed location(s) within the data path. The data path analysis and modeling process 140-2 first identifies components at a source location of a data path, at a target location of the data path, and connections there between, step 501, as described above. The network environment includes a plurality of domains, such that the data path traverses the plurality of domains. The data path analysis and modeling process 140-2 then assigns components and the connections there between to one of: an input-output path pattern, a virtualizer pattern, and a meta pattern, step 502. The patterns represent common elements of components of the network environment, and the patterns and relationships between patterns are defined to repeat within and across domains in the network environment, as described above. The data path analysis and modeling process 140-2 then creates a model of the data path from the assigned patterns and the defined relationships between patterns, step 503, and presents the created model of the data path, step 504.

Using the created model, in some embodiments, the data path analysis and modeling process 140-2 is then able to create a query, step 505. Upon execution, the created query defines elements of the data path from the source location to the target location by using the repetitive and recursive structure of the patterns and the relationships between the patterns. In other words, because a virtualizer pattern is defined as being, in some embodiments, in the context of a storage network environment, a mapping between a disk and a disk address within a domain, the data path analysis and modeling process 140-2 knows that, if it encounters a disk within a domain, and that domain is not a physical storage domain, there must be a virtualizer pattern connecting that disk to a disk address. For example, see the example modeled data path shown in FIG. 2D that begins in the application domain of the host domain and continues through to the physical domain of the array domain. Every time a disk (that is, an element corresponding to some data) is defined as existing within a domain, that disk is also associated with a virtualizer pattern that connects the disk to a disk address (that is, an elements corresponding to the location of where that data is stored), except for the disk found in the physical domain of the array domain, which is a physical storage domain. The same holds true for the IO path pattern (see again FIG. 2D) and the meta pattern (no example shown), and is true no matter what the domain is. The data path analysis and modeling process 140-2 is thus able to create query language that logically follows from these repeated patterns and how they inter-relate, no matter what the network environment is.

Of course, the data path analysis and modeling process 140-2 may repeat this procedure as many times as desired to create as many queries as desired. Further, in some embodiments, the data path analysis and modeling process 140-2 need not have a start point and/or an end point within a modeled data path to create a query, but rather may be simply provided a middle point and may work forwards and backwards along the modeled data path to create a query that, when executed, determines all components and the connections there between that comprise the modeled data path. For example, in the context of a storage network environment, the data path analysis and modeling process 140-2 may be provided with a particular host bus adaptor that is part of a modeled data path. The data path analysis and modeling process 140-2 is then able to create a query that uses the host bus adaptor as a starting point and determines appropriate query language to describe any and all data paths that include that particular host bus adaptor.

In some embodiments, after the data path analysis and modeling process 140-2 creates one or more queries, the data path analysis and modeling process 140-2 receives notification that a new component has been added to the data path, step 506. For example, in a storage network environment, an administrator of a storage area network may have determined that the storage area network needed further storage capacity, and thus may have added further storage elements connected to storage elements that are part of the modeled data path. The data path analysis and modeling process 140-2 may then use the created query, step 507, to determine how the new component fits within the data path. That is, because the query relies on the repetitive and recursive nature of the three basic patterns used in the model to determine components along a modeled data path, the query need not be changed even if new components are added to that modeled data path. The data path analysis and modeling process 140-2 may use the exact same query, which will discover (for example) the new storage elements described above as it processes. In other words, the data path analysis and modeling process 140-2, when executing the query, will find all storage elements along the data path, including the newly added storage elements, because all of the storage elements (previous and new) are described according to the model in the same way.

Figure 6:
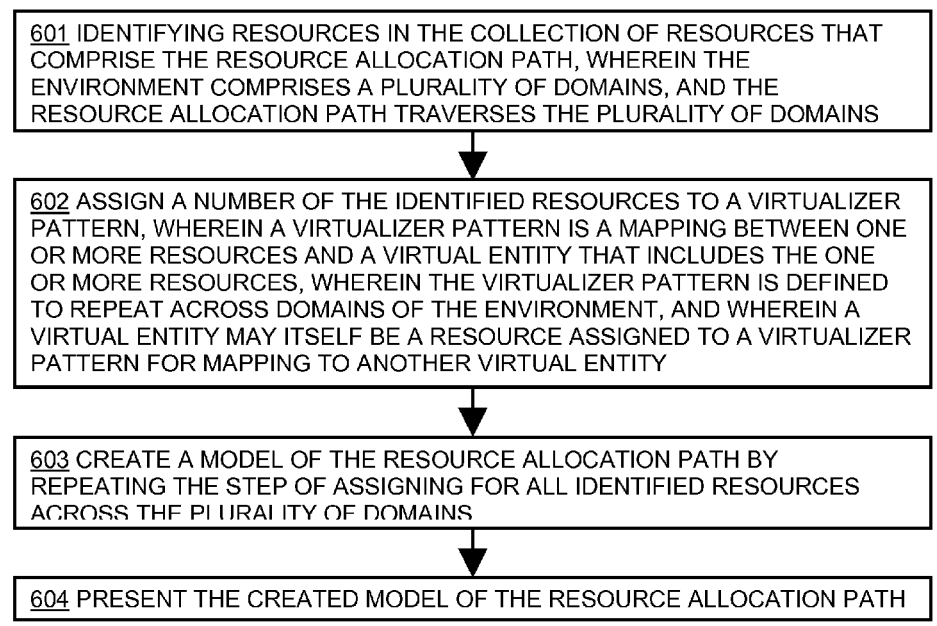
FIG. 6 illustrates a flowchart of a procedure performed by the system of FIG. 1 when modeling a resource allocation path in any environment using a virtualizer pattern.

FIG. 6 illustrates an embodiment of the data path analysis and modeling process 140-2 that models a resource allocation path within any environment. A resource allocation path may include a data path as described above, and, in the context of FIG. 6, the resource allocation path comprises a collection of resources. The collection of resources is part of a plurality of resources that is located in an environment. In other words, the environment may be any context that includes a plurality of resources. Resources may be anything of value that are interrelated in some known way. Thus, the embodiment described in connection with FIG. 6 may be applied to model any number of resource allocation paths, such as but not limited to data paths and other resource allocation paths as found in a storage network environment, data paths and other resource allocation paths as found in a computer network environment, and resource allocation paths as found in other network environments (i.e., a financial network, an organization of a business, etc.).

The data path analysis and modeling process 140-2 first identifies resources in the collection of resources that comprise the resource allocation path, step 601. The environment comprises a plurality of domains, and thus the resource allocation path traverses the plurality of domains. The data path analysis and modeling process 140-2 then assigns a number of the identified resources to a virtualizer pattern, wherein a virtualizer pattern is a mapping between one or more resources and a virtual entity that includes the one or more resources, step 602. The virtualizer pattern is defined to repeat across domains of the environment. A virtual entity may itself be a resource assigned to a virtualizer pattern for mapping to another virtual entity. The data path analysis and modeling process 140-2 then creates a model of the resource allocation path by repeating the step of assigning for all identified resources across the plurality of domains, step 603, and presents the created model of the resource allocation path, step 604, as described herein.

For example, using the embodiment described in FIG. 6, it is possible to model computing resources in an environment. For example, four computers may be present in the environment, each including four processors. The data path analysis and modeling process 140-2 may identify one processor from each computer, according to step 601. The data path analysis and modeling process 140-2 may then assign the four processors to a virtualizer pattern according to step 602. Here, the four processors may be virtualized to a virtual machine that is a grouping of the four processors. In other words, the grouping of the four processors is exported to the virtual machine entity, such that the virtual machine entity is able to act as if there is a single physical machine that includes those four processors, even though the processors are (in reality) located in different physical machines. The virtual machine is then able to allocate processes to those processors. The data path analysis and modeling process 140-2 is able to repeat the assigning step for any other computing resources, according to step 603, such as but not limited to memory units, storage units, display units, and so on. The data path analysis and modeling process 140-2 then presents the model according to step 604. If the group of computers in the environment is itself part of a network of computers, the data path analysis and modeling process 140-2 may be used to assign the virtualizer pattern to some portion of that network, such that a grouping of virtual machines (which are themselves mapped to real resources according to a virtualizer pattern) is virtualized to a virtual network entity. The assigning of the virtualizer pattern may continue until the entire network is modeled.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method of modeling data paths of a storage area network comprising:
  identifying components at a source location of a data path, at a target location of the data path, and connections there between, wherein the network environment comprises a plurality of domains, and the data path traverses the plurality of domains;

assigning components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment, wherein the virtualizer pattern expresses the many-to-many mapping from disk address to disk through an extent, the input-output path pattern provides for the importation of a disk through an associated initiator in one domain from a disk exported from a target of another domain, and the meta pattern indicates that a disk can be composed of zero, one, or more disks;

creating a model of the data path from the assigned patterns and the defined relationships between patterns, wherein the application of the meta pattern and the virtualizer pattern in sequence describes the data path in one domain and a subsequent application of the input-output path pattern describes the data path from a disk in one domain to a disk in another domain;

creating a model of the storage area network by:
repeating the steps of identifying, assigning, and creating from each data path present in the storage area network; and
combining each created model of each data path present in the storage area network according to connections between the data paths; and presenting the created model of the storage area network.

2. The method of claim 1 comprising:
identifying further components and connections there between the source location and the target location of the data path;
assigning the further components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment; and
augmenting the created model by including the assigned patterns of the further identified components and the connections there between according to the defined relationships between patterns.

3. The method of claim 2 wherein identifying further components and connections there between comprises:
querying, from a connection point of the source location, a successive domain in the network environment to identify further components and connections there between;
repeating the step of querying for each successive domain in the network environment until the target location is queried; and wherein augmenting comprises:
augmenting the created model by including the assigned patterns of the further identified components and the connections there between according to the defined relationships between patterns across successive domains between the source location and the target location of the data path.

4. The method of claim 2 wherein identifying further components and connections there between comprises:
identifying a new component in the network environment along the data path and any resulting connections required for the new component.

5. The method of claim 1 comprising:
creating a query that, upon execution, defines elements of the data path from the source location to the target location by using the repetitive and recursive structure of the patterns and the relationships between the patterns.

6. The method of claim 5 comprising:
receiving notification that a new component has been added to the data path; and
using the created query to determine how the new component fits within the data path.

7. A computer system comprising:
a memory;
a processor;
a display; and
an interconnection mechanism coupling the memory, the processor and the display allowing communication there between;
wherein the memory of the computer system is encoded with a data path analysis and modeling application, that when executed in the processor, provides a data path analysis and modeling process that analyzes and models data paths of a storage area network, by causing the computer system to perform operations of:
identifying components at a source location of a data path, at a target location of the data path, and connections there between, wherein the network environment comprises a plurality of domains, and the data path traverses the plurality of domains;
assigning components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment, wherein the virtualizer pattern expresses the many-to-many mapping from disk address to disk through an extent, the input-output path pattern provides for the importation of a disk through an associated initiator in one domain from a disk exported from a target of another domain, and the meta pattern indicates that a disk can be composed of zero, one, or more disks;
creating a model of the data path from the assigned patterns and the defined relationships between patterns, wherein the application of the meta pattern and the virtualizer pattern in sequence describes the data path in one domain and a subsequent application of the input-output path pattern describes the data path from a disk in one domain to a disk in another domain;
creating a model of the storage area network by:
repeating the steps of identifying, assigning, and creating from each data path present in the storage area network; and
combining each created model of each data path present in the storage area network according to connections between the data paths; and
presenting the created model of the storage area network.

8. The computer system of claim 7 comprising:
identifying further components and connections there between the source location and the target location of the data path;
assigning the further components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment; and augmenting the created model by including the assigned patterns of the further identified components and the connections there between according to the defined relationships between patterns.

9. The computer system of claim 8 wherein identifying further components and connections there between comprises:

querying, from a connection point of the source location, a successive domain in the network environment to identify further components and connections there between;

repeating the step of querying for each successive domain in the network environment until the target location is queried; and wherein augmenting comprises:

augmenting the created model by including the assigned patterns of the further identified components and the connections there between according to the defined relationships between patterns across successive domains between the source location and the target location of the data path.

10. The computer system of claim 8 wherein identifying further components and connections there between comprises:

identifying a new component in the network environment along the data path and any resulting connections required for the new component.

11. The computer system of claim 7 comprising:

creating a query that, upon execution, defines elements of the data path from the source location to the target location by using the repetitive and recursive structure of the patterns and the relationships between the patterns.

12. The computer system of claim 11 comprising:

receiving notification that a new component has been added to the data path; and using the created query to determine how the new component fits within the data path.

13. A computer program product, stored on a non-transitory computer readable storage medium, to model data paths of a storage area network, the computer program product comprising:

computer program code for identifying components at a source location of a data path, at a target location of the data path, and connections there between, wherein the network environment comprises a plurality of domains, and the data path traverses the plurality of domains;

computer program code for assigning components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment, wherein the virtualizer pattern expresses the many-to-many mapping from disk address to disk through an extent, the input-output path pattern provides for the importation of a disk through an associated initiator in one domain from a disk exported from a target of another domain, and the meta pattern indicates that a disk can be composed of zero, one, or more disks;

computer program code for creating a model of the data path from the assigned patterns and the defined relationships between patterns, wherein the application of the meta pattern and the virtualizer pattern in sequence describes the data path in one domain and a subsequent application of the input-output path pattern describes the data path from a disk in one domain to a disk in another domain;

creating a model of the storage area network by:

repeating the steps of identifying, assigning, and creating from each data path present in the storage area network; and combining each created model of each data path present in the storage area network according to connections between the data paths; and computer program code for presenting the created model of the storage area network.

14. The computer program product of claim 13 comprising:

computer program code for identifying further components and connections there between the source location and the target location of the data path;

computer program code for assigning the further components and the connections there between to one of: an input-output path pattern, a virtualizer pattern, and a meta pattern, wherein the patterns represent common elements of components of the network environment, wherein the patterns and relationships between patterns are defined to repeat within and across domains in the network environment; and computer program code for augmenting the created model by including the assigned patterns of the further identified components and the connections there between according to the defined relationships between patterns.

15. The computer program product of claim 14 wherein computer program code for identifying further components and connections there between comprises:

computer program code for querying, from a connection point of the source location, a successive domain in the network environment to identify further components and connections there between;

computer program code for repeating the step of querying for each successive domain in the network environment until the target location is queried; and wherein computer program code for augmenting comprises:

computer program code for augmenting the created model by including the assigned patterns of the further identified components and the connections there between according to the defined relationships between patterns across successive domains between the source location and the target location of the data path.

16. The computer program product of claim 14 wherein computer program code for identifying further components and connections there between comprises:

computer program code for identifying a new component in the network environment along the data path and any resulting connections required for the new component.

17. The computer program product of claim 13 comprising:

computer program code for creating a query that, upon execution, defines elements of the data path from the source location to the target location by using the repetitive and recursive structure of the patterns and the relationships between the patterns.

18. The computer program product of claim 17 comprising:

computer program code for receiving notification that a new component has been added to the data path; and computer program code for using the created query to determine how the new component fits within the data path.

* * * * *